United States Patent [19]

Bockman

[11] Patent Number: 5,064,289

[45] Date of Patent: Nov. 12, 1991

[54] LINEAR-AND-ANGULAR MEASURING PLANE MIRROR INTERFEROMETER

[75] Inventor: John J. Bockman, Santa Clara, Calif.

[73] Assignee: Hewlett-Packard Company, Palo Alto, Calif.

[21] Appl. No.: 314,348

[22] Filed: Feb. 23, 1989

[51] Int. Cl.$^5$ .............................................. G01B 9/02
[52] U.S. Cl. .................................. 356/351; 356/358; 356/363
[58] Field of Search ......................... 356/358, 363, 351

[56] References Cited

U.S. PATENT DOCUMENTS 4,859,066  8/1989  Sommargren .................. 356/363 X Primary Examiner—Davis L. Willis
Assistant Examiner—Matthew W. Koren
Attorney, Agent, or Firm—James M. Williams

[57] ABSTRACT

A linear-and-angular measuring plane mirror interferometer measures two degrees of freedom, both linear translation and rotation angle, using a single interferometer optical assembly. In alternate orientations it can be used to measure either the pitch, roll or yaw angle. The linear-and-angular measuring interferometer splits the measurement beam at the interferometer optic, using a single integrated optical assembly to make measurements at two locations on a measuring mirror on a stage. In a first embodiment, the input beam is split, and two separate measurements, X and X', are made at two locations separated by a distance d. A second embodiment optically produces a direct measurement of X—X' at a detector. The input beam makes one interferometer measurement for X, then the polarization of part of the resulting output beam is rotated and the rotated part of the beam is returned for a second pass to make an interferometer measurement at a location offset by a distance d from the first pass measurement.

8 Claims, 6 Drawing Sheets

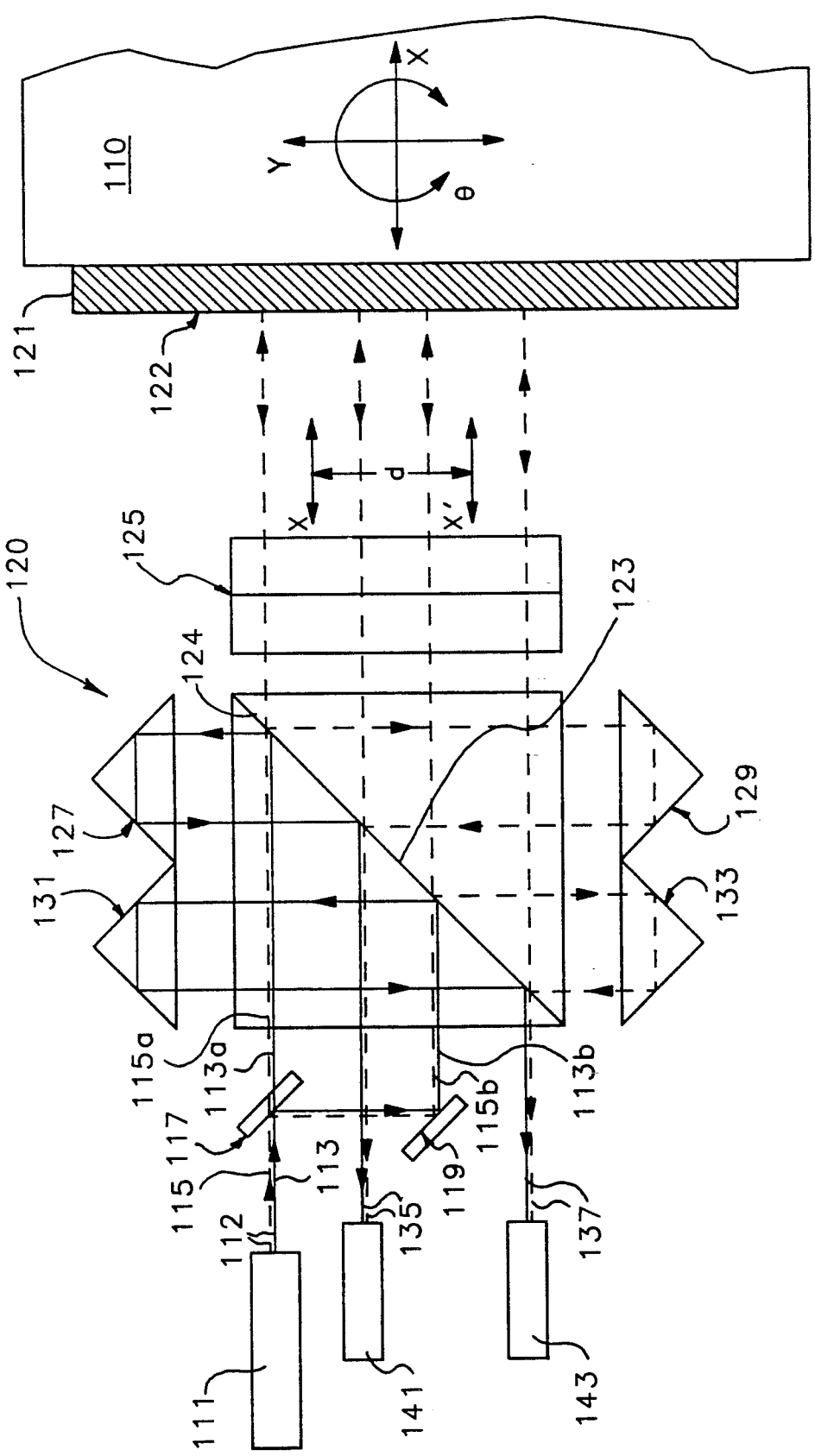
FIG_1

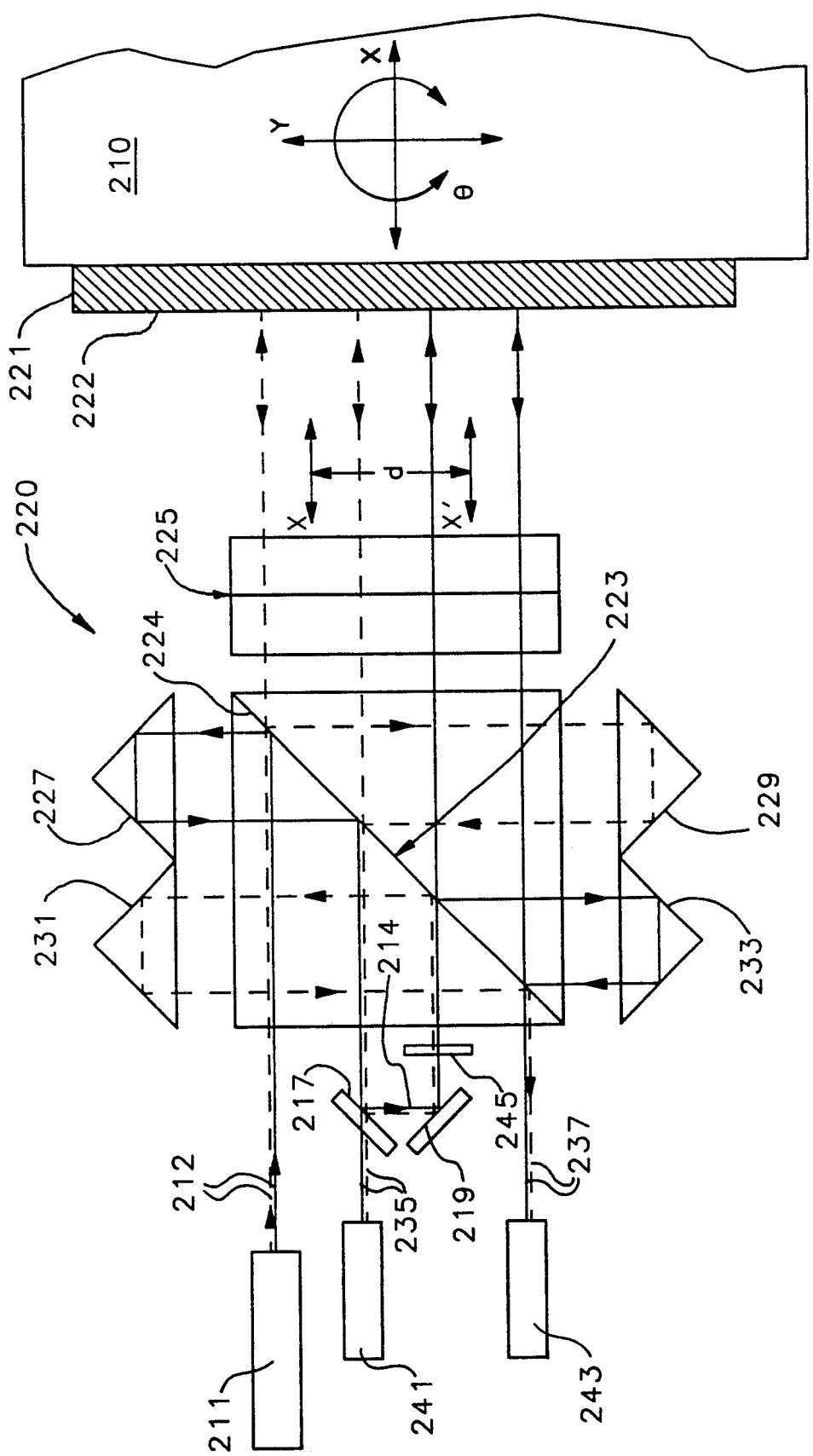
FIG_ 2

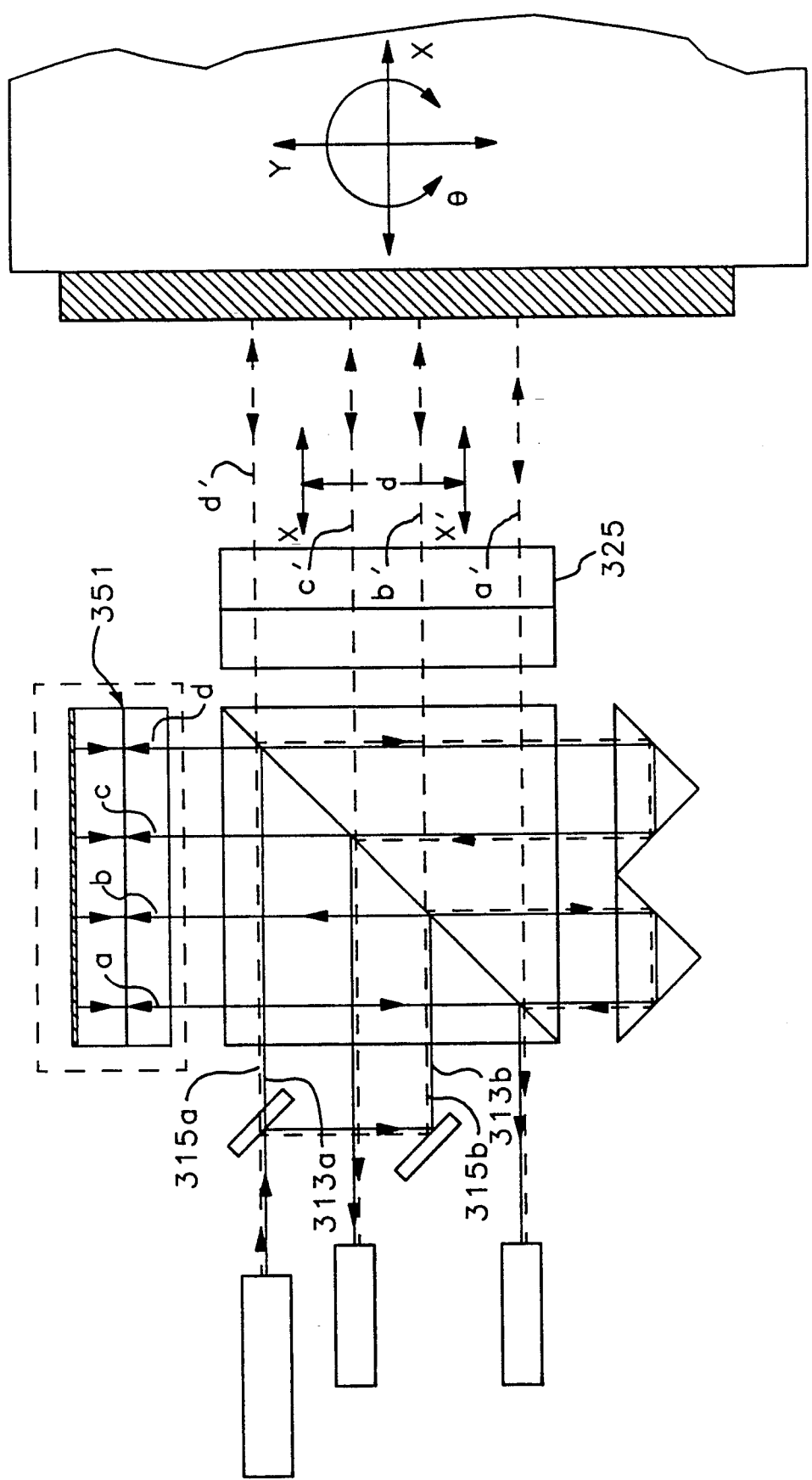
FIG_3

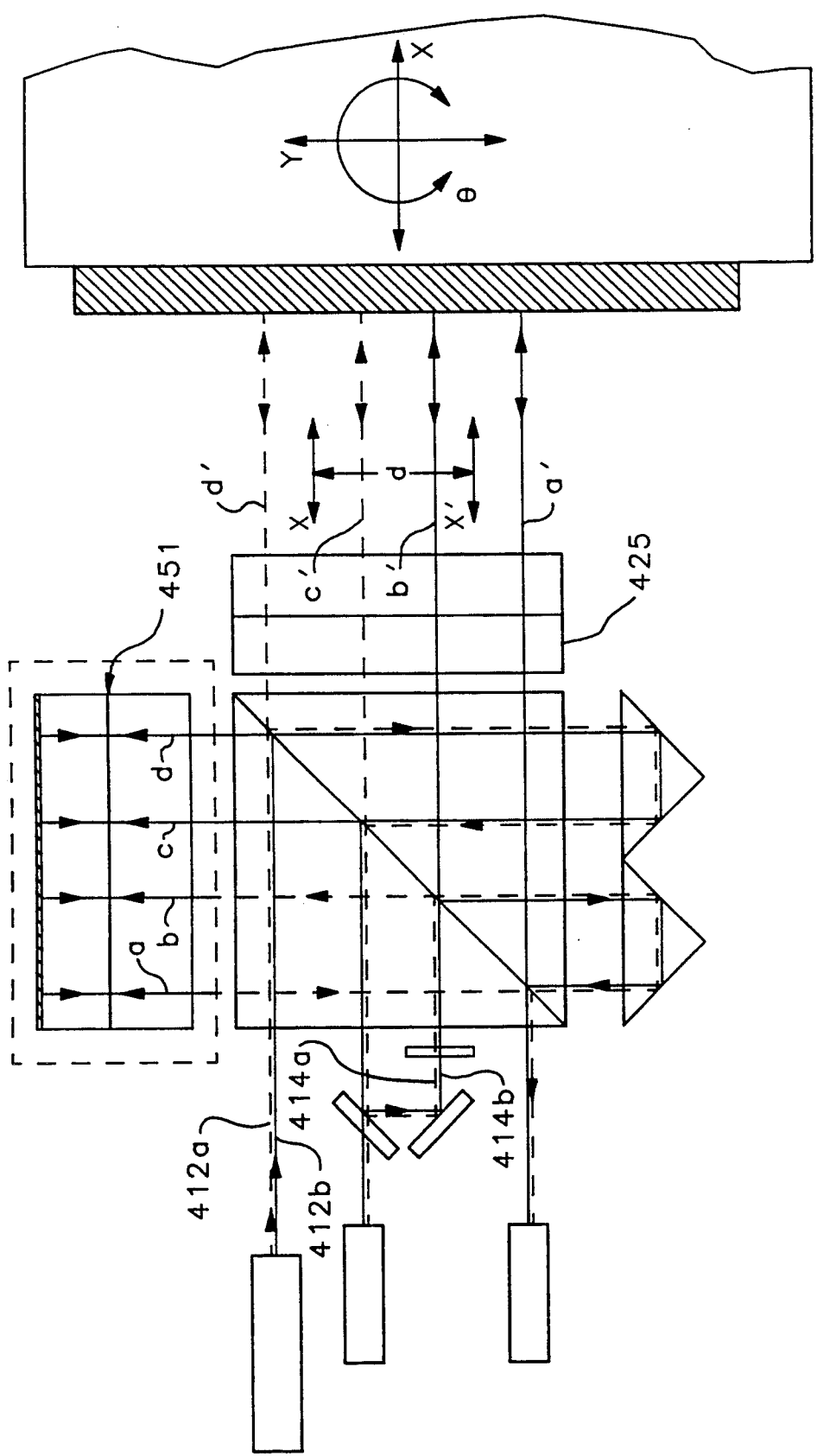
FIG_4

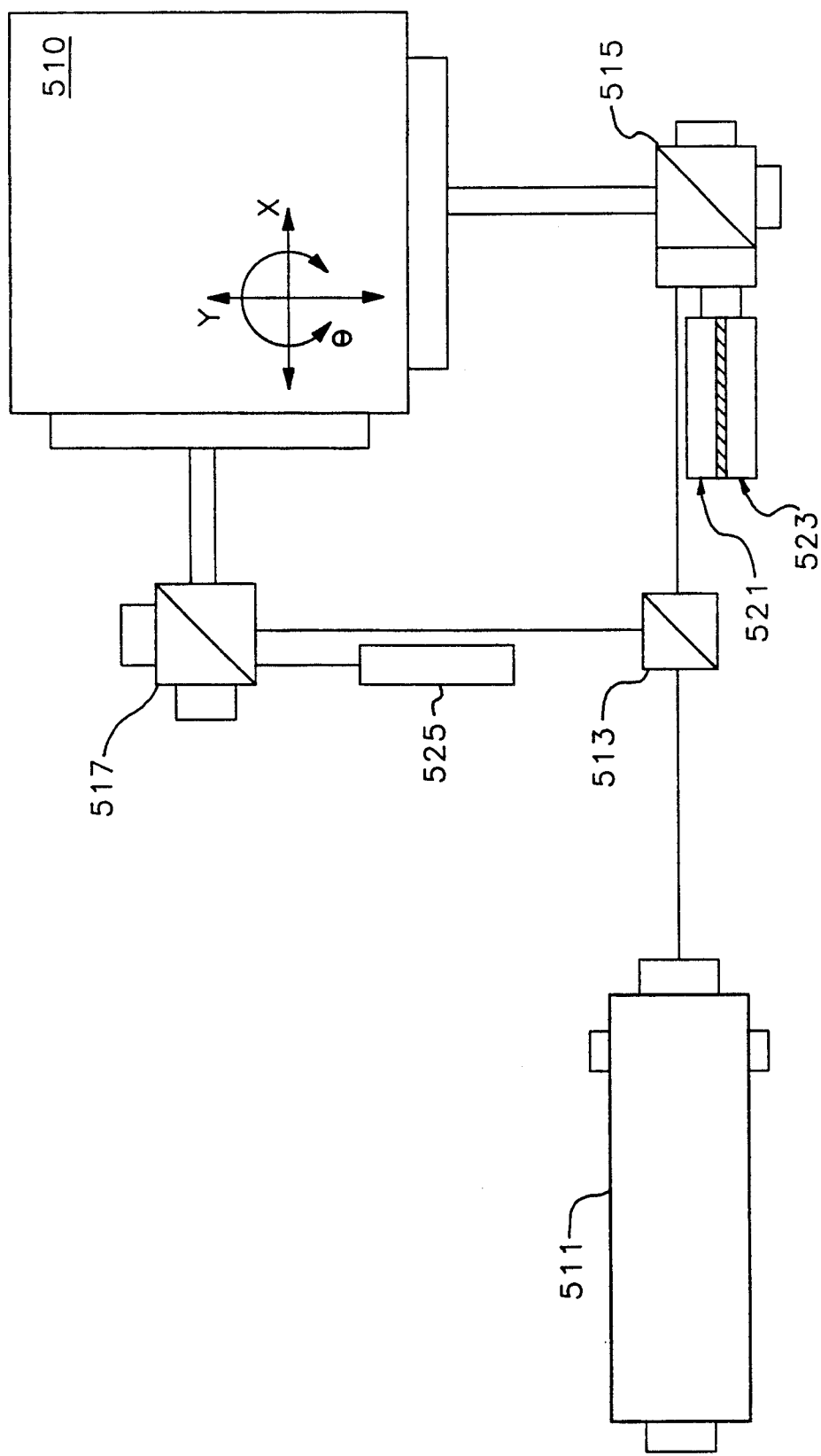
FIG_ 5

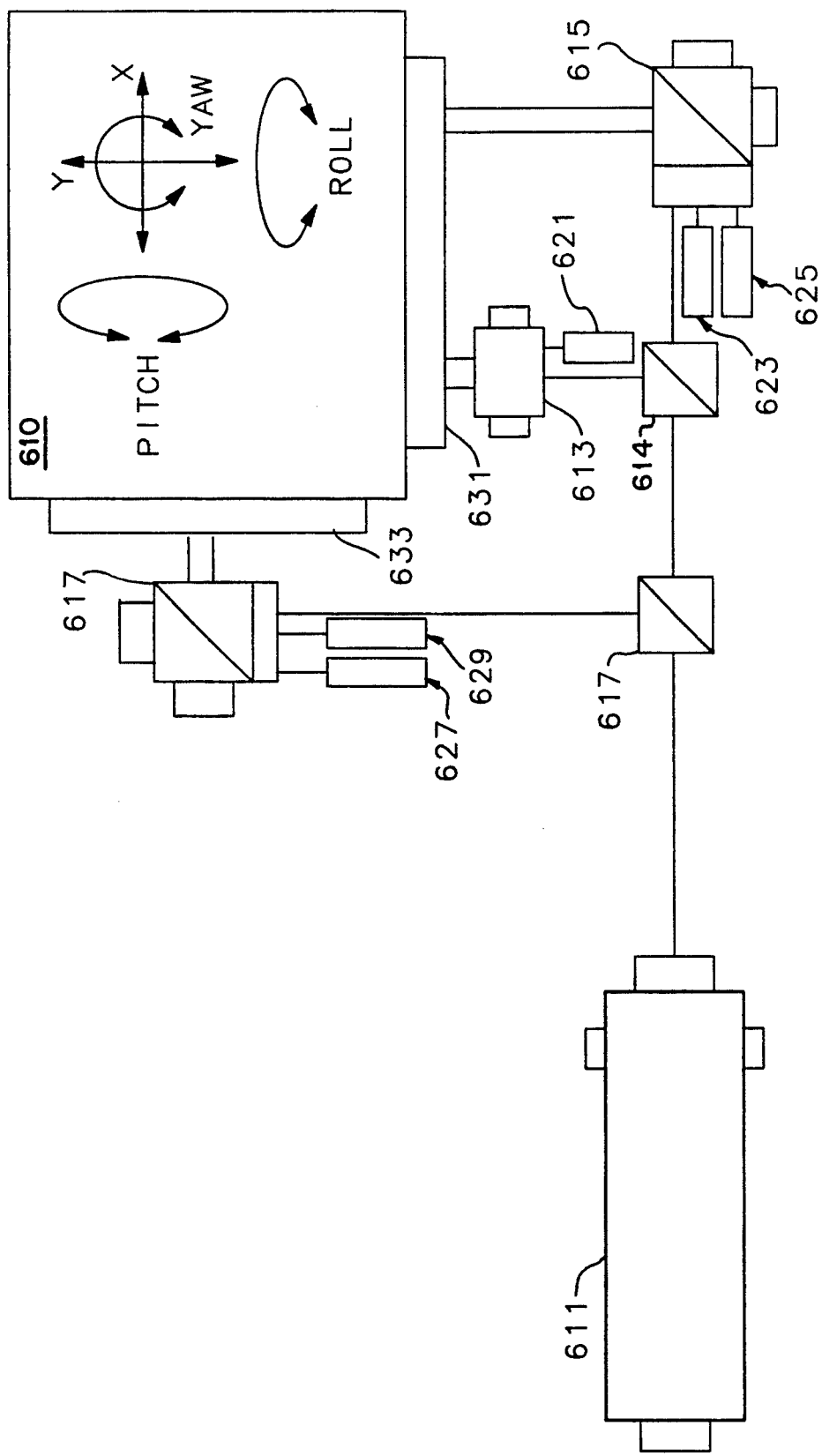
FIG_ 6

LINEAR-AND-ANGULAR MEASURING PLANE MIRROR INTERFEROMETER

BACKGROUND OF THE INVENTION

Precision translation stages, such as those used in IC wafer steppers, employ laser interferometers for position feedback sensors. In a typical application, three degrees of freedom are measured. Two of these are linear displacement of the stage along the X and Y axes. The third is yaw, rotation of the stage about the Z axis orthogonal to the X—Y plane.

Plane mirror interferometers are typically used to make these measurements. Two measurement mirrors are mounted on the stage, one orthogonal to the X axis, the other orthogonal to the Y axis. The length of these plane mirrors is determined primarily by the distance the stage travels in both X and Y.

Conventionally, a separate plane mirror interferometer optical assembly is necessary to measure each degree of freedom. Two optical assemblies are used to measure X and Y position. A third optical assembly is necessary on either the X or Y axis to measure yaw angle. The third interferometer measures a separate position measurement, e.g., X' at a distance d from the X position measurement. With X, X', and d (the distance between X and X'), the yaw angle theta can be calculated.

$$\text{Theta} = \text{Arctan}((X - X')/d) \quad (1)$$

In addition to these typical measurements, measuring pitch and roll of the stage (rotation about the X and Y axes respectively) will be desirable as the need increases to position wafer stepper stages more precisely. With a conventional system, an additional plane mirror interferometer optical assembly is needed for each additional degree of freedom measured.

There are a number of disadvantages to using additional interferometer optical assembliess to measure each additional degree of freedom. One disadvantage is the cost of additional interferometer and associated mounting hardware and additional beam directing optics and their mounting hardware. A second disadvantage is the labor needed to align the additional interferometer and associated beam directing optics.

Other disadvantages affect the stage. The measurement plane mirror must be lengthened by the distance d, or another mirror must be added, to accommodate additional measurements on an axis. To measure pitch or roll the mirror must be taller as well as longer. With conventional plane mirror interferometer optical assemblies, d is a minimum of 2.5" because of the size of the interferometers. The size and mass of the larger mirror on the stage is undesirable because it increases the inertia of the stage. The larger mirrors can also obstruct air flow over the stage.

Additional interferometer optical assemblies also present obstructions to air flow in the stage area, in conflict with another need of precision stages in wafer steppers. To minimize temperature and pressure gradients around the stage, manufacturers are starting to use laminar air flow across the stage. The space taken up by the additional interferometers around the stage causes turbulence in the air flow over the stage, disrupting laminar flow and allowing hot spots and pressure variations to form. Thus, it is desirable to limit the number of inteferometer optical assemblies around the stage.

SUMMARY OF THE INVENTION

The linear-and-angular measuring plane mirror interferometer of the invention measures two degrees of freedom, both linear translation and rotation angle, using a single interferometer optical assembly. In alternate orientations it can be used to measure either the pitch, roll or yaw angle of the stage. With one of these interferometers and one conventional plane mirror interferometer, X, Y, and yaw of a stage can be measured. To measure X, Y, pitch, roll, and yaw of the stage, only three interferometer optical assemblies are necessary, one a conventional plane mirror interferometer and two others linear-and-angular measuring plane mirror interferometers. Five conventional plane mirror interferometer optical assemblies would be necessary to make such a measurement, and the stage mirrors would have to be made much larger than normal.

The linear-and-angular measuring interferometer of the invention splits the measurement beam at the interferometer optic, using a single integrated optical assembly to make measurements at two locations on the measuring mirror on the stage. The invention uses a number of shared optical components to implement two interferometers with a single optical assembly that is only slightly larger than an optical assembly for a conventional plane mirror interferometer.

In a first embodiment, the input beam is split, and two separate measurements, X and X', are made at two locations separated by a distance d. X—X' is calculated electronically by subtracting the X' result from the X result.

A second embodiment optically produces a direct measurement of X—X' at a detector. The input beam makes one interferometer measurement for X, then the polarization of part of the resulting output beam is rotated and the rotated part of the beam is returned for a second pass to make an interferometer measurement at a location offset by a distance d from the first pass measurement. The resulting second pass output beam optically produces a direct measurement of X—X' at a detector.

Since the interferometer of the invention measures both linear translation and angle of a moving stage, in a single optical assembly, the need for a second interferometer optical assembly on that axis is eliminated. This reduces the obstruction to airflow in stage area, and also reduces the difficulty of aligning the system because fewer separate optical elements are used. The compact beam spacing allows for a minimum size measuring mirror, making roll and pitch measurement practical because the smaller vertical dimension of the measuring mirror can be accommodated more easily on the stage. In the second embodiment, the X—X' detector registers counts only when the stage is rotated. This simplifies the stage control electronics.

BRIEF DESCRIPTION OF THE DRAWINGS

FIG. 1 shows a first embodiment of the invention in a plane mirror interferometer, in which the input beam is split before passing through the optical assembly, and two separate measurements, X and X', are made.

FIG. 2 shows a second embodiment of the invention, in which the input beam 112 is split after making one pass through the optical assembly.

FIG. 3 shows a further embodiment of the invention in an interferometer that has high thermal stability, with an optical path similar to the optical arrangement of the FIG. 1 embodiment.

FIG. 4 shows a further embodiment of the invention in an interferometer that has high thermal stability, with an optical path similar to the optical arrangement of the FIG. 2 embodiment.

DETAILED DESCRIPTION OF THE INVENTION

FIG. 1 shows a first embodiment of the invention in a plane mirror interferometer. The interferometer uses a light source 111 to produce an input beam 112 comprising a reference beam 113 and a measurement beam 115. Light source 111 is preferably a two-frequency laser producing a reference beam 113 of frequency $f_1$ linearly polarized in the plane of the drawing and a measurement beam of frequency $f_2$ linearly polarized perpendicular to the plane of the drawing.

The input beam 112 is split before it enters the optical assembly 120 of the interferometer. The reference beam 113 and the measurement beam 115 are split into two sets, 113a, 115a and 113b, 115b. The reference beams 113a, 113b follow a fixed length path through optical assembly 120 and to detectors 141 and 143. The measurement beams 115a, 115b follow a path to a movable measurement mirror 121 on the object 110. The two measurement beams are directed along parallel paths separated by a distance d, to make essentially two independent measurements of the distance to the object 110. The mirror surface 122 of movable mirror 121 reflects the measurement beams back through optical assembly 120 and to detectors 141 and 143. Detectors 141 and 143 use mixing polarizers to mix the reference and measurement beams and a photodetector to detect the fringes of the interference pattern that results when the path length of a measurement beam changes.

Optical assembly 120 comprises a polarizing beam splitter 123 with a beam splitting surface 124 at a 45 degree angle to the incident light beams, quarter wave plate 125 and cube corners 127, 129, 131 and 133. Quarter wave plate 125 is transparent and effectively rotates the plane of polarization of the beams by 90 degrees each time the beams traverse the quarter wave plate twice.

The first reference beam 113a and the first measurement beam 115a are the portion of the input beam 112 transmitted by non-polarizing 50% beam splitter 117. The first reference beam 113a is at frequency $f_1$ and linearly polarized in the plane of the drawing. Beam 113a is reflected by beam splitting surface 124 to cube corner 129 where it is redirected back through polarizing beam splitter 123, and reflected by beam splitting surface 124 on a path parallel to its original path toward detector 141.

First measurement beam 115a is at frequency $f_2$ and linearly polarized perpendicular to the plane of the drawing. Being polarized perpendicular to reference beam 113a, first measurement beam 115a passes through beam splitting surface 124 and through quarter wave plate 125 to movable mirror 121 which reflects it back toward optical assembly 120, again through quarter wave plate 125. This time beam 115a is reflected by beam splitting surface 124 toward cube corner 129 which returns it to beam splitting surface 124 which directs first measurement beam 115a back through quarter wave plate 125 to moveable measurement mirror 121 and then back through quarter wave plate 125. With the polarization state changed by 90 degrees, measurement beam 115a passes through beam splitting surface 124 to detector 141.

The second reference beam 113b and the second measurement beam 115b are the portion of the input beam 112 reflected by non-polarizing 50% beam splitter 117 to reflector 119 which redirects the beams 113b and 115b into the polarizing beam splitter 123 along a path parallel to the path of beams 113a and 115a. The beams 113b and 115b are reflected by the measurement mirror 121 at a location at a distance d from where the beams 113a and 115a contacted the measurement mirror 121. The distance d is determined by the spacing between the centerlines of cube corners 129 and 133.

Second reference beam 113b is reflected by beam splitting surface 124 to cube corner 131 where it is redirected back through polarizing beam splitter 123, and reflected by beam splitting surface 124 on a path parallel to its original path towards detector 143.

Second measurement beam 115b passes through beams splitting surface 124 and through quarter wave plate 125 to movable mirror 121 which reflects it back toward optical assembly 120, again through quarter wave plate 125. This time beam 115b is reflected by beam splitting surface 124 toward cube corner 133 which returns it to beam splitting surface 124 which directs second measurement beam 115b back through quarter wave plate 125 to moveable measurement mirror 121 and then back through quarter wave plate 125. With the polarization state changed by 90 degrees, the second measurement beam 115b passes through beam splitting surface 124 to detector 143.

The first reference beam 113a and the first measurement beam 115a are combined to form first output beam 135, which is directed to the first detector 141. The second reference beam 113b and the second measurement beam 115b are combined to form second output beam 137, which is directed to second detector 143. Detectors 141 and 143 use mixing polarizers to mix the reference and measurement beams and a photodetector to detect the fringes of the interference pattern that results when the path length of a measurement beam changes. Both detectors measure changes in the distance to the measurement plane mirror 121, and thus to object 110. But because the two measurements are made a distance d apart, the rotation (yaw) of the object 110 can be calculated from the difference between the two measurements.

The distance measurement made by first detector 141 is used as the X-axis linear displacement measurement X. The measurement made by second detector 143, X', is used to calculate the rotation angle theta using formula (1) as explained above:

$$\text{Theta} = \text{Arctan}((X - X')/d) \quad (1)$$

The resolution of the rotation angle measurement depends on the length of d, among other things. If the other variables are held constant, doubling the length d will also increase the resolution by a factor of two. In a typical interferometer system, with a system resolution of 1/128 of the beam wavelwngth and a beam wavelength of 633 nanometers, a length d of 0.5 inches will produce a resolution of 0.08 arc seconds for the rotation angle measurement. In the same system, if d is doubled, to 1.0 inch, the resounution is increased proportionately, to 0.04 arc seconds. Another well known way to increase resolution is to increase the number of round trips the measurement beam makes to the measurement mirror. The disadvantage to this method is a decrease in the capability of the interferometer system to measure high slew rates.

In the embodiment shown in FIG. 1, the rotation angle theta must be calculated from the two measurement results, using for example a microprocessor (not shown). In another embodiment, shown in FIG. 2 and described in more detail below, the difference X—X' is generated optically and measured directly by the detector, eliminating the need for the electronic calculation. If only an error indication is required, and not the actual value of the rotation angle theta, the difference X—X' may be a sufficient output signal, eliminating the need for any electronic calculation.

FIG. 2 shows a second embodiment of the invention, in which the input beam 212 makes one pass through the optical assembly 220, and the resulting first pass output beam 235 is split. Part of the first pass output beam 235 is directed to a first detector 241, to make the X-axis displacement measurement along the X path. The other portion of the first pass output beam 235 becomes the second pass input beam 214. The polarization of the second pass input beam 214 is rotated 90 degrees by half wave plate 245 and beam 214 then makes a second pass through the optical assembly 220. The second pass to object 210 is along the X' path, parallel to and offset from the X path by the distance d. The second pass output beam is directed to a second detector 243.

Over the first and second passes, the $f_1$ component and the $f_2$ component of the beam each traverse both reference and measurement paths, a distance d apart. If the object 210 has not rotated, the paths lengths for the $f_1$ component and the $f_2$ component will be the same. Any yaw rotation of the measurement mirror 221 will produce a difference in the path lengths and an apparent distance change measured at the second detector 243.

Optical assembly 220 in FIG. 2 is similar to optical system 120 shown in FIG. 1. The two differences are the position of the non-polarizing beam splitter 217 and the addition of a half wave plate 245. The components in the FIG. 2 embodiment which correspond to the components in the FIG. 1 embodiment, have reference numbers 2XX rather than 1XX.

In the FIG. 2 embodiment, the input beam 212 makes one pass through the optical assembly 220, and the resulting first pass output beam 235 is split. Thus, the non-polarizing beam splitter 217 is not located in the path of the input beam 212, as it is in the FIG. 1 embodiment. Instead, the non-polarizing beam splitter 217 is located in the path of the first pass output beam 235, after the beam has made one pass through the optical assembly 220. Beam splitter 217 splits the first pass output beam 235 so a portion is transmitted to the first detector 241 and another portion, beam 214, is reflected to reflector 219, through half wave plate 245 and directed into the optical assembly 220 for a second pass to produce a second pass output beam 237 that is directed to second detector 243 for measuring the yaw rotation of the object 210.

Half wave plate 245 rotates the polarization of the $f_1$ and $f_2$ components of the beam 214 by 90 degrees. As a result, the $f_1$ component of beam 214, which followed the reference path on the first pass now follows a measurement path to the measurement mirror 221 and back. The $f_2$ portion of beam 214, which followed the measurement path on the first pass, now follows a reference path. If the object 210 undergoes a pure translation along the X-axis, the $f_1$ path will change on the beam's first pass through the optical assembly 220, and the $f_2$ path length will change correspondingly on the beam's second pass through the optical assembly 220. The two changes will cancel, so there will be no indication at detector 243. If the object 210 undergoes a yaw rotation, the $f_1$ and $f_2$ path lengths will change differentially, and there will be an indication of a change at the second detector 243.

The distance measurement made by first detector 241 is used as the X-axis linear displacement measurement X. The measurement made by second detector 243 is a direct measurement of X—X' because of the path switching of the $f_1$ and $f_2$ components. This X—X' measurement can be used to calculate the rotation angle theta using formula (1), or as an error indication.

FIGS. 3 and 4 show two further embodiments of the invention that have high thermal stability, incorporating the teaching of U.S. Pat. No. 4,784,490 "High Thermal Stability Plane Mirror Interferometer". The FIGS. 3 and 4 embodiments are otherwise similar to the optical arrangements of the FIGS. 1 and 2 embodiments, respectively. In the FIGS. 3 and 4 embodiments, two of the cube corners are replaced with a reflective quarter wave plate 351, 451 having the same optical thickness as the quarter wave plates 325 and 425, respectively. The substitution of the reflective quarter wave plate changes the reference paths so that the reference and measurement beams follow different but optically equivalent paths through optical elements that are in thermal equilibrium. That is, the path lengths through the high refractive index medium of the optics are the same length, but do not follow the same path.

In FIG. 3, quarter wave plate 351 replaces cube corners 127 and 131 of FIG. 1. In FIG. 4, quarter wave plate 451 replaces cube corners 227 and 231 of FIG. 2.

As in the FIG. 1 and FIG. 2 embodiments, in the embodiment shown in FIG. 3, the rotation angle theta must be calculated from the two measurement results X and X'. In the embodiment shown in FIG. 4, the difference X—X' is generated optically and measured directly by the detector, eliminating the need for the electronic calculation. If only an error indication is required, and not the actual value of the rotation angle theta, the difference X—X' may be a sufficient output signal, eliminating the need for any electronic calculation.

An inspection of the paths of reference beams 313a and 313b and measurement beams 315a and 315b in FIG. 3 reveals that where the beams follow paths that are not common, their lengths are equivalent, except for the paths from the optical assembly to the measurement mirror. Thus, paths a, b, c and d of reference beams 313a and 313b have the same length as paths a', b', c' and d' of measurement beams 315a and 315b.

An inspection of the paths of the reference and measurement portions of first input beam and second input beam in FIG. 4 reveals that where the beams follow paths that are not common, their lengths are equivalent, except for the paths from the optical assembly to the measurement mirror. Thus, paths a, b, c and d of the reference portions 421a, 414a of beams 412 and 414 in FIG. 4 have the same length as paths a', b', c' and d' of the measurement portions 412b, 414b of beams 412 and 414.

FIG. 5 shows a schematic diagram of a laser interferometer measurement system incorporating one linear-and-angular measurement interferometer and one conventional plane mirror interferometer for measuring linear displacement along the X and Y axes, and yaw (rotation around the Z axis). The beams for the two interferometers are provided by a laser 511 through a 33% beam splitter 513. The linear-and-angular measurement interferometer 515 is located on the Y axis for measuring the Y displacement of the stage 510 at detector 521, and measuring Y—Y' at detector 523 to determine the yaw. The conventional plane mirror interferometer 517 is located on the X axis for measuring the X displacement of the stage 510 at detector 525. The X and Y displacement measurements are made on the centerline of the optical column (not shown) over the stage 510.

FIG. 6 shows a schematic diagram of a laser interferometer measurement system incorporating two linear-and-angular measurement interferometers and one conventional plane mirror interferometer for measuring linear displacement along the X and Y axes, and pitch, roll and yaw (rotation around the X, Y and Z axes respectively). The beams for the three interferometers are provided by a laser 511 through two 33% beam splitters 513 and 514. The conventional plane mirror interferometer 517 is located on the Y axis for measuring the Y displacement of the stage 510 at detector 621. One linear-and-angular measurement interferometer 515 is located along the Y axis for measuring Y' at detector 523 and Y" at detector 525. The Y' and Y" measurements are made at a location offset from the Y measurement in the X axis direction. The Y' and Y" measurements are offset from each other by a distance d in the Z axis direction. Thus Y—Y' can be used to determine the yaw of stage 510 and Y'—Y" can be used to determine the pitch of stage 510. The second linear-and-angular measurement interferometer 517 is located on the X axis for measuring the X displacement of the stage 510 at detector 527, and measuring X—X' at detector 529. The X and X' measurements are offset from each other by a distance d in the Z axis direction, so X—X' can be used to determine the roll of stage 510. The two plane measurement mirrors 631 and 633 must be larger than d in the Z axis direction to accommodate the pitch and roll measurements.

The optical assembly of the invention can be configured either in a "straight through" alignment, as illustrated in FIGS. 1–4, or in a "right angle" alignment, as illustrated in FIGS. 5 and 6, to suit the needs of the installation.

I claim:

1. An interferometer for measuring the linear motion of an object along a first axis and the angular motion of the object around a second axis orthogonal to the first axis, using a single integral optical assembly, comprising:
   light source means for producing a coherent light beam;
   reflecting means mounted on a movable measurement plane located on the object, for reflecting the beam;
   integral optical assembly means for directing the beam along a first path between the optical means and the reflecting means, and along a second path between the optical means and the reflecting means, the first path incident on the reflecting means at only two points around a first location and the second path incident on the reflecting means at only two points around a location, the first and second locations separated by a distance d;
   means for determining the change in the length of the first path;
   means for determining the difference between the change in the length of the first path and the change in the length of the second path, and for calculating the angular motion of the object based on the result.

2. The interferometer of claim 1 wherein the distance d is less than two inches.

3. The interferometer of claim 1, wherein:
   the optical assembly means includes means for splitting the beam into two portions prior to directing the first portion of the beam along the first path and the second portion of the beam along the second path;
   the means for determining the change in the length of the first path comprises a first detector positioned for receiving the first portion of the beam after the first portion of the beam has traversed the first path and measuring the change in the length of the first path; and
   the means for determining the difference between the change in the length of the first path and the change in the length of the second path comprises a second detector, positioned for receiving the second portion of the beam after the second portion of the beam has traversed the second path, for measuring the change in the length of the second path, and counting means responsive to the first receiver and to the second receiver for calculating the difference between the change in the length of the first path and the change in the length of the second path.

4. The interferometer of claim 1, wherein:
   the coherent light beam comprises a plane polarized first component and a second component plane polarized perpendicular to the first component;
   the optical assembly means includes means for splitting the beam into two portions after the beam has traversed the first path, directing the first portion of the beam to a first detector and directing the second portion of the beam toward the second path, and optical means for rotating the polarization of the first and second components of the second portion of the beam by ninety degrees before the second portion of the beam enters the second path;
   the means for determining the change in the length of the first path comprises the first detector positioned for receiving the first portion of the beam after the beam has traversed the first path and measuring the change in the length of the first path; and
   the means for determining the difference between the change in the length of the first path and the change in the length of the second path comprises a second detector positioned for receiving the second portion of the beam after the second portion of the beam has traversed the second path, for directly determining the change in the length of the first path with respect to the length of the second path.

5. The interferometer of claim 3 wherein,
   the optical means comprises:
   a first beam splitter having a square cross section with a first surface through which the light beams enter from the light source means, a second surface opposite the first surface, third and fourth surfaces adjacent the first surface, and with a first plane polarizing beam splitter surface diagonal to the first surface;

a transparent quarter wave plate mounted on the second surface;

first and second cube corners mounted on the third surface;

third and fourth cube corners mounted on the fourth surface;

a second beam splitter mounted in the path of the beam between the light source and the first surface, for splitting the beam into a first portion following the first path and a second portion following the second path;

the first component of the beam follows a reference path and the second component of the beam follows a measurement path; and the first path passes through the second beam splitter, then the first beam splitter separates the first component of the beam from the second component of the beam, the first component passing sequentially through the first beam splitter, through the first cube corner, once through the beam splitter, and to the detector; the second component passing sequentially through the beam splitter, the transparent quarter wave plate, to the reflecting means, through the transparent quarter wave plate, the first beam splitter, the third cube corner, the first beam splitter, the transparent quarter wave plate, to the reflecting means, through the transparent quarter wave plate, the first beam splitter, and to the first detector;

the second path is reflected by the second beam splitter, then the first beam splitter separates the first component of the beam from the second component of the beam, the first component passing sequentially through the first beam splitter, through the second cube corner, once through the first beam splitter, and to the detector; the second component passing sequentially through the first beam splitter, the transparent quarter wave plate, to the reflecting means, through the transparent quarter wave plate, the first beam splitter, the fourth cube corner, the first beam splitter, the transparent quarter wave plate, to the reflecting means, through the transparent quarter wave plate, the first beam splitter, and to the second detector.

6. The interferometer of claim 4 wherein, the optical means comprises:

a first beam splitter having a square cross section with a first surface through which the light beams enter from the light source means, a second surface opposite the first surface, third and fourth surfaces adjacent the first surface, and with a plane polarizing beam splitter surface diagonal to the first surface;

a transparent quarter wave plate mounted on the second surface;

first and second cube corners mounted on the third surface;

third and fourth cube corners mounted on the fourth surface;

a second beam splitter mounted in the path of the beam between the first beam splitter and the first detector for splitting the beam into a first portion directed to the first detector and a second portion directed through a half wave plate and back into the first beam splitter through the first surface;

the first component of the beam is initially polarized so that it is reflected by the polarizing beam splitter surface and the second component of the beam is initially polarized so that it is transmitted by the polarizing beam splitter surface; and the beam passes into the first beam splitter which separates the first component of the beam from the second component of the beam, the first component passing sequentially through the first beam splitter, through the first cube corner, once through the first beam splitter, and toward the first detector; the second component passing sequentially through the first beam splitter, the transparent quarter wave plate, to the reflecting means, through the transparent quarter wave plate, the first beam splitter, the third cube corner, the first beam splitter, the transparent quarter wave plate, to the reflecting means, through the transparent quarter wave plate, the first beam splitter, and toward the first detector;

the beam is then split by the second beam splitter into a first pass output beam portion passing to the first detector and a second pass beam portion directed through the half wave plate which rotates the plane of polarization of the first and second beam components by ninety degrees so the first component is transmitted and the second component is reflected by the polarizing beam splitter surface; and the second pass beam portion then passes through the first surface of the first beam splitter, the first beam splitter separates the first component of the second pass beam portion beam from the second component of the second pass beam portion, the second component passing sequentially through the first beam splitter, through the second cube corner, once through the first beam splitter, and to the second detector; the first component passing sequentially through the first beam splitter, the transparent quarter wave plate, to the reflecting means, through the transparent quarter wave plate, the first beam splitter, the fourth cube corner, the first beam splitter, the transparent quarter wave plate, to the reflecting means, through the transparent quarter wave plate, the first beam splitter, and to the second detector.

7. The interferometer of claim 1, for measuring with high thermal stability, wherein, the optical assembly means comprises:

a first beam splitter having a square cross section with a first surface through which the light beams enter from the light source means, a second surface opposite the first surface, third and fourth surfaces adjacent the first surface, and with a first plane polarizing beam splitter surface diagonal to the first surface;

a transparent quarter wave plate mounted on the second surface;

a reflective quarter wave plate mounted on the third surface;

first and second cube corners mounted on the fourth surface;

a second beam splitter mounted in the path of the beam between the light source and the first surface, for splitting the beam into a first portion following the first path and a second portion following the second path;

the first component of the beam follows a reference path and the second component of the beam follows a measurement path; and the first path passes through the second beam splitter, then the first beam splitter separates the first component of the beam from the second component of the beam, the first component passing sequentially through the first beam splitter, the reflective quarter wave plate, through the first beam splitter, the first cube corner, through the first beam splitter, the reflective quarter wave plate, the first beam splitter, and to the first detector; the second component passing sequentially through the first beam splitter, the transparent quarter wave plate, to the reflecting means, through the transparent quarter wave plate, the first beam splitter, the first cube corner, the first beam splitter, the transparent quarter wave plate, to the reflecting means, through the transparent quarter wave plate, the first beam splitter, and to the first detector;

the second path is reflected by the second beam splitter, then the first beam splitter separates the first component of the beam from the second component of the beam, the first component passing sequentially through the first beam splitter, the reflective quarter wave plate, through the first beam splitter, the second cube corner, through the first beam splitter, the reflective quarter wave plate, the first beam splitter, and to the second detector; the second component passing sequentially through the first beam splitter, the transparent quarter wave plate, to the reflecting means, through the transparent quarter wave plate, the first beam splitter, the second cube corner, the first beam splitter, the transparent quarter wave plate, to the reflecting means, through the transparent quarter wave plate, the first beam splitter, and to the second detector.

8. The interferometer of claim 1 for measuring with high thermal stability, wherein, the optical assembly means comprises:

a first beam splitter having a square cross section with a first surface through which the light beams enter from the light source means, a second surface opposite the first surface, third and fourth surfaces adjacent the first surface, and with a plane polarizing beam splitter surface diagonal to the first surface;

a transparent quarter wave plate mounted on the second surface;

a reflective quarter wave plate mounted on the third surface;

first and second cube corners mounted on the fourth surface;

a second beam splitter mounted in the path of the beam between the first beam splitter and the first detector for splitting the beam into a first portion directed to the first detector and a second portion directed through a half wave plate and back into the first beam splitter through the first surface;

the first component of the beam is initially polarized so that it is reflected by the polarizing beam splitter surface and the second component of the beam is initially polarized so that it is transmitted by the polarizing beam splitter surface; and the beam passes into the first beam splitter which separates the first component of the beam from the second component of the beam, the first component passing sequentially through the first beam splitter, the reflective quarter wave plate, through the first beam splitter, the first cube corner, through the first beam splitter, the reflective quarter wave plate, the first beam splitter, and toward the first detector; the second component passing sequentially through the first beam splitter, the transparent quarter wave plate, to the reflecting means, through the transparent quarter wave plate, the first beam splitter, the first cube corner, the first beam splitter, the transparent quarter wave plate, to the reflecting means, through the transparent quarter wave plate, the first beam splitter, and toward the first detector;

the beam is then split by the second beam splitter into a first pass output beam portion passing to the first detector and a second pass beam portion directed through the half wave plate which rotates the plane of polarization of the first and second beam components by ninety degrees so the first component is transmitted and the second component is reflected by the polarizing beam splitter surface; and the second pass beam portion then passes through the first surface of the first beam splitter, the first beam splitter separates the first component of the second pass beam portion beam from the second component of the second pass beam portion, the second component passing sequentially through the first beam splitter, the reflective quarter wave plate, through the first beam splitter, the second cube corner, through the first beam splitter, the reflective quarter wave plate, the first beam splitter, and to the second detector; the first component passing sequentially through the second component passing sequentially through the first beam splitter, the transparent quarter wave plate, to the reflecting means, through the transparent quarter wave plate, the first beam splitter, the second cube corner, the first beam splitter, the transparent quarter wave plate, to the reflecting means, through the transparent quarter wave plate, the first beam splitter, and to the second detector.

* * * * *